United States Patent [19]
Parish, II et al.

[11] Patent Number: 5,628,585
[45] Date of Patent: May 13, 1997

[54] METHOD AND APPARATUS FOR REMOVAL OF UTILITY LINE AND REPLACEMENT WITH POLYOLEFIN PIPE

[75] Inventors: Robert O. Parish, II, Cleveland; Cleve C. Reber, Pasadena, both of Tex.

[73] Assignee: TTI Trenchless Technologies, Inc., Conroe, Tex.

[21] Appl. No.: 433,259

[22] Filed: Apr. 28, 1995

[51] Int. Cl.$^6$ ................................ F16L 1/00; E21D 1/06
[52] U.S. Cl. ........................ 405/154; 405/184; 175/53
[58] Field of Search ................................ 405/154, 156, 405/165, 168.3, 174, 184; 175/95, 96, 53

[56] References Cited

U.S. PATENT DOCUMENTS

| | | | |
|---|---|---|---|
| 3,181,302 | 5/1965 | Lindsay | 61/72.7 |
| 4,401,170 | 8/1983 | Cherrington | 175/73 |
| 4,505,302 | 3/1985 | Streatfield et al. | 138/97 |
| 4,507,019 | 3/1985 | Thompson | 405/154 |
| 4,544,041 | 10/1985 | Rinaldi | 175/57 |
| 4,634,313 | 1/1987 | Robbins | 405/184 |
| 4,648,746 | 3/1987 | Abinett | 405/184 |
| 4,674,914 | 6/1987 | Wayman et al. | 405/154 |
| 4,693,404 | 9/1987 | Wayman et al. | 225/103 |
| 4,723,873 | 2/1988 | Masznyik | 405/156 |
| 4,726,711 | 2/1988 | Tian | 405/154 X |
| 4,732,222 | 3/1988 | Schmidt | 175/22 |
| 4,767,236 | 8/1988 | Rice | 405/154 |
| 4,886,396 | 12/1989 | Akesaka | 405/184 |
| 4,915,543 | 4/1990 | Akesaka | 405/156 |
| 4,925,344 | 5/1990 | Peres | 405/184 |
| 4,930,542 | 6/1990 | Winkle | 138/98 |
| 4,981,181 | 1/1991 | Hesse | 175/19 |
| 4,983,071 | 1/1991 | Fisk et al. | 405/154 |
| 5,007,767 | 4/1991 | Stafford | 405/154 |
| 5,096,002 | 3/1992 | Cherrington | 175/53 |
| 5,112,158 | 5/1992 | McConnell | 405/154 |
| 5,314,267 | 5/1994 | Osadchuk | 405/154 X |
| 5,452,967 | 9/1995 | Fuller | 405/154 X |

*Primary Examiner*—Frank Tsay
*Attorney, Agent, or Firm*—Mary J. Gaskin

[57] ABSTRACT

The present invention is directed to a method for removing a utility pipe or main and replacing the main with a polyolefin pipe. More specifically, the unique apparatus or system of the present invention includes a rotating head connected to a plurality of pipe joints to remove the old pipe, usually concrete or tile, by cutting, chipping and grinding. The head has an outer periphery of roller bits which cut, chip and grind the old pipe or earth into pieces which pass inwardly through the head. Behind the head is a non-rotating member which opens and packs the hole formed by the head for the replacement polyolefin pipe which is pulled into the hole by the member.

9 Claims, 4 Drawing Sheets

METHOD AND APPARATUS FOR REMOVAL OF UTILITY LINE AND REPLACEMENT WITH POLYOLEFIN PIPE

FIELD OF THE INVENTION

The present invention is directed to a unique method used to remove existing utility lines, such as sewer, gas and water, and replace the utility line with polyolefin pipe. In addition the present invention is directed to a unique head which removes or eliminates the old utility line. More specifically, the unique apparatus or system of the present invention includes a rotating head with two sets of roller bits to remove the old pipe, usually concrete or tile, by cutting, chipping and grinding. The head is attached to a member which pulls a polyolefin pipe to replace the old utility line.

BACKGROUND OF THE INVENTION

The replacement of utility lines is a significant part of the renewing of the infrastructure within the United States and other countries of the world. More and more this replacement work is done without cutting trenches to remove the old pipes and replacing with the new pipes. Also the trend is to use polyolefin pipe, especially polyethylene pipe, as the replacement pipe. The present invention is directed to a unique method for removing old pipe and replacing with a polyethylene pipe. In addition, the present invention is directed to a unique system or apparatus including a unique head.

British Gas was a leader in the development of a system to replace gas lines with a system disclosed in U.S. Pat. Nos. 4,505,302; 4,674,914 and 4,693,404. In each of these patents a device is inserted into the existing main and the device, either pivoted cutters or a vibratable breaker device, fractures the main.

Water Research Centre of England have U.S. patents disclosing a system for pipe laying and replacement. U.S. Pat. Nos. 4,634,313 and 4,648,746 both disclose apparatus which have a pneumatically-operated impact device to fracture the existing main.

U.S. Pat. Nos. 4,732,222 and 4,981,181 both disclose an impact device to fracture or break-up the old pipe laid in the ground.

U.S. Pat. No. 4,723,873 discloses a method and apparatus for preparing an existing buried conduit by cooling the conduit or existing main before it is fractured by compressive and impact forces.

U.S. Pat. No. 4,983,071 discloses another device which uses a pneumatically operated impact ram to fracture the existing main.

Each of the foregoing patents disclose a system wherein a impact device is required to fracture the existing main. However, these systems using high impact forces to fracture the main can cause damage to surrounding structures such as buildings and overlying streets or alleyways. Furthermore, the force which will fracture a main in non-compacted ground may be well within the design of the apparatus; however, if the ground is compacted, or concrete surrounds the main, or tree roots or other impediments that can not be seen or foreseen are present, then the fracture of the main may fail to take place.

U.S. Pat. No. 4,507,019 discloses a pipe replacement system which includes an expansion and line replacement mandrel which is inserted into the existing main and a power system which imparts linear movement and rotation to the mandrel. U.S. Pat. No. 4,925,344 discloses another mandrel for the system of the U.S. Pat. No. 4,507,019 patent.

These foregoing patents disclose a system which uses rotation rather than impact to fracture the existing main; however, this system suffers the same deficiencies as the high impact system. When cement is used in a repaired tap or connection to the main, or tree roots or solid rock are in contact with the outside of the main, the system of these patents may not be able to fracture the existing main.

U.S. Pat. No. 4,767,236 discloses a plurality of radially expandable tubular members or liners which engage and then ruptures the portion of the existing pipe adjacent the members or liners.

The system of this patent has no practical application.

U.S. Pat. Nos. 4,886,396 and 4,915,543 disclose a system which includes a shield tunneling machine advanced from a starting shaft, a thrust device for forcing the new concrete pipe into a vacant spot excavated by the machine and advancing the machine, a seal device movable in the existing line ahead of the machine, a discharging device for discharging the excavated substance onto the ground and a temporary watercourse device for permitting sewage to flow through the seal device to a pipeline on the downstream side.

U.S. Pat. No. 4,930,542 discloses a system wherein short-pipes are pressed one after the other intermittently into the pipeline end to end. An expansion piercer or similar broaching tool is pushed through the pipeline at the leading end of the pipe string.

Each of the foregoing patents disclose a system wherein the entire success is dependant on the ability to push short lengths of pipe over a certain distance; however, there is no stability to directing the tunneling machine or expansion piercer tool to follow the path of the old main. The patents assume that the integrity of the main to be replaced will provide the direction of the system; however, mains are replaced due to the lack of integrity of the old mains.

U.S. Pat. No. 5,112,158 discloses a system wherein a head surrounds the outside of the main to be replaced and cuts and breaks the existing line.

The advantages of the method and apparatus of the present invention are that the system is stable in alignment and grade both in the removal of the old main and in the replacement of the polyolefin pipe, the system destroys existing connections and concrete encasements as well as intrusions such as tree roots, the system may use fluid to reduce heat or friction and improve hole stability, and the system can be placed into a ten foot pit. Thus, the present invention not only overcomes the deficiencies of the prior art but has substantial technical advantage over all the known systems.

SUMMARY OF THE INVENTION

The present invention is directed to a method for removing a utility pipe or main and replacing the main with a polyolefin pipe. More specifically, the unique apparatus or system of the present invention includes a rotating head connected to a plurality of pipe joints to remove the old pipe, usually concrete or tile, by cutting, chipping and grinding. The head has an outer periphery of roller bits which cut, chip and grind the old pipe or earth into pieces which pass inwardly through the head. Behind the head is a non-rotating member which opens and packs the hole formed by the head for the replacement polyolefin pipe which is pulled into the hole by the member.

BRIEF DESCRIPTION OF THE PREFERRED EMBODIMENTS

The apparatus system of the present invention uniquely solves the problems encountered by the technologies of the prior art. The system of the present invention requires pits to work at the level of the existing utility line. In the method and apparatus of the present invention, it is preferred to have two pits, one pit at each end of the section of the existing line to be removed and replaced. In some special situations, the method and apparatus of the present invention may be used with a single pit at one end of the section of line to be removed and a manhole at the other end.

Figure 1:
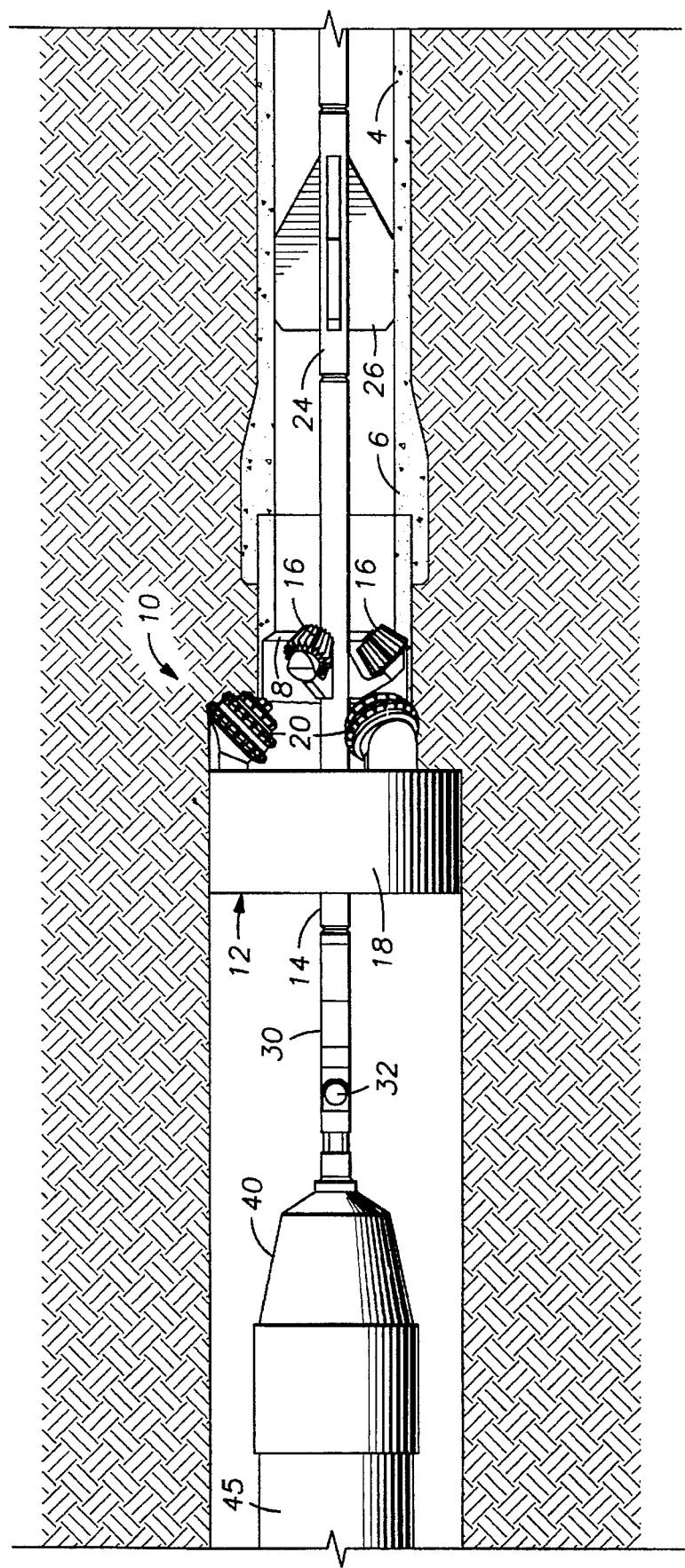
FIG. 1 is an elevational view of the system of the present invention removing an old main.

Referring now to FIG. 1, the system of the present invention 10 is shown between two pits (not shown). The pit to the left of FIG. 1 is the pit in which the system 10 is assembled and through which the fused polyolefin pipe is pulled from the surface into the hole formed by the system of the present invention. The pit to the right of FIG. 1 is the pit which has the equipment for operating the system 10 of the present invention; namely, a drilling unit and a power unit (both of which will be described in more detail hereinafter). The drilling unit is placed into the pit and the power unit is usually maintained on the surface near the pit.

To initiate the operation for removing an existing utility main and replacing that main with a polyolefin pipe in the preferred embodiment of the present invention, pits are dug at the ends of the section of utility main to be removed. In most instances manholes are spaced about 400' apart and sections to be replaced are usually the 400' to 800' or more between manholes. The preferred embodiment of the present invention can easily remove and replace sections of 400' to 800' or more in a single set up of the system 10. One pit is dug at one end of the section and a second pit dug at the other end. In one pit (the right pit), the drilling unit is set to align with the center of the existing utility line to be removed and a string of pipe joints is pushed from the drilling unit through the existing line to the other pit (left pit). The head 12 of the present invention is assembled in the pit to the left and begins its operation aligned with the existing line. The head 12 of the present invention is rotated by the drill string of pipe joints and moved from the left pit to the right pit.

In the preferred embodiment of the system 10 of the present invention, a head 12 is connected to the drilling string of pipe joints 14. The preferred head 12 has a first set of roller bits 16. Roller bits 16 are welded or otherwise affixed near to the shaft or joint of pipe 14 to engage the inner diameter of the existing line 4 and to score the inner surface of line 4. As head 12 rotates, these roller bits 16 are maintained or stabilized by the inner diameter of existing line 4. A band 18 encircles shaft or joint 14 and carries a second set of roller bits 20. Roller bits 20 cut, chip and grind the existing line 4 into pieces that pass through the head 12. As noted in FIG. 1, roller bits 16 are in a plane different than the roller bits 20. Thus roller bits 16 engage line 4 before the roller bits 20 which helps stabilize the head 12 as it engages and removes line 4.

In an embodiment of the present invention, a 8¾" tri-cone bit from Varel Manufacturing was cut into three pieces, each containing a single cone and welded to the shaft 14 of head 12 as roller bits 16. The bits 20 were Varel Manufacturing—13½" Hole Openers.

Figure 2:
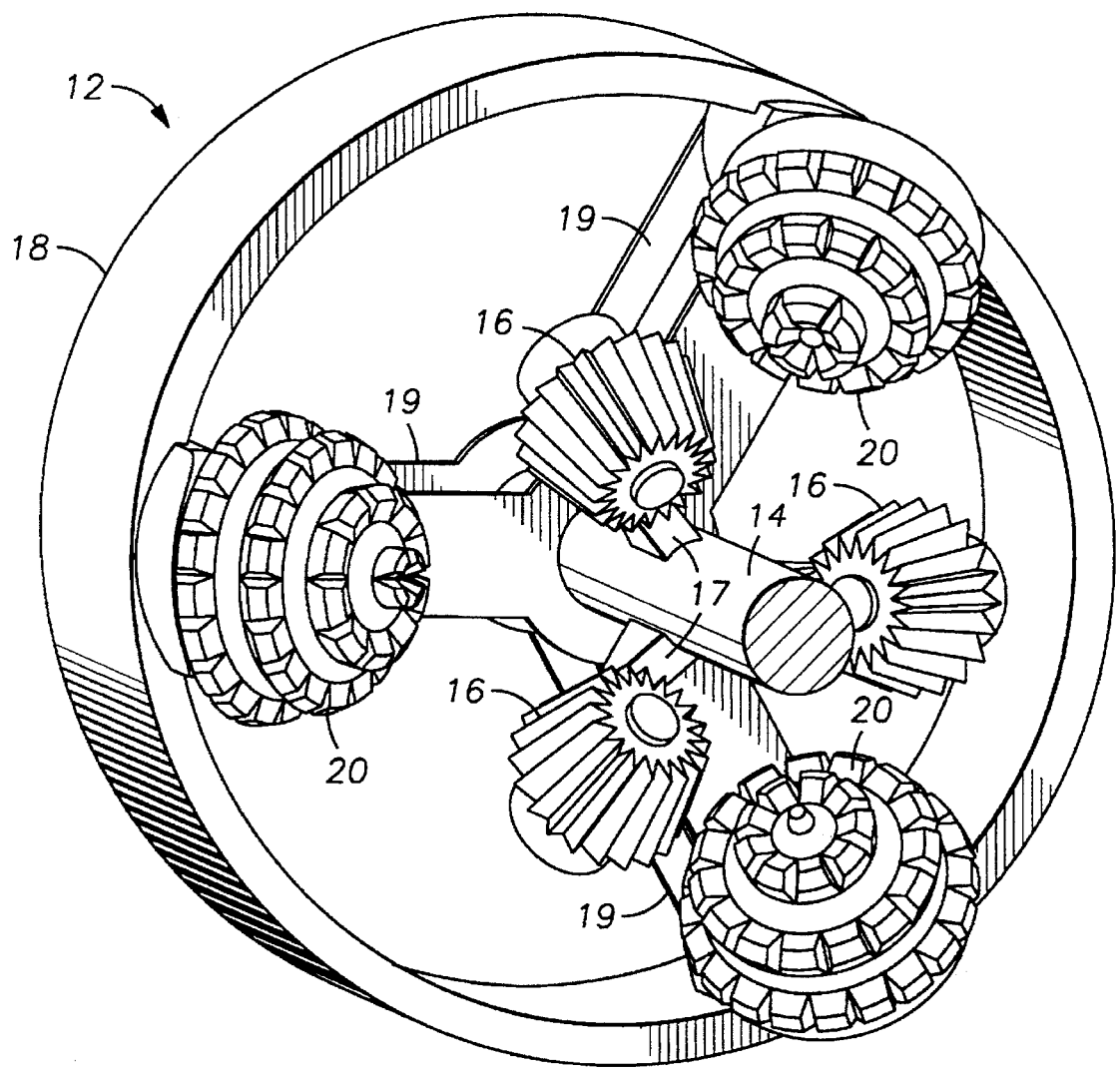
FIG. 2 is a perspective view of a preferred embodiment of a head used in the system of the present invention.

The size, bit face design, position and number of roller bits used on the head 12 are not limited to that shown but will vary depending on a number of factors. The most commonly encountered utility line for sewers or wastewater are cement or tile; however, if the utility is gas, then the lines may be cast iron. A choice of a particular roller bit (because of materials of construction or design) may be used in one situation over the other. Suitable roller bits both in size, design for cutting rock or metal are found in the drilling and mining art. One factor in the design of a specific head is that at least one set of roller bits must engage all the surfaces of the existing line 4. As seen in FIG. 1, the roller bits 20 not only engage the remaining portion of line 4 not cut away by roller bits 16 but will engage and cut away the bells 6 which have a larger outside diameter than line 4. The specific configuration of the head 12 may be different than that shown in FIG. 2 due to a specific diameter of the existing utility line and the desired diameter of the replacement polyolefin pipe. For example, if diameters are large, over one foot, then there may be more than two sets of roller bits in the head design. Another factor in the design of a specific head is the diameter of the existing line 4 to be removed and the desired diameter of the polyolefin pipe which will replace the line. For example, the design of the head 12 shown in FIG. 1 illustrates a design which will remove a line 4 of one diameter and replace it with a larger diameter pipe (e.g. 8" concrete replaced with 10" polyethylene pipe; 4" or 6" tile replaced with 8" polyethylene pipe). The preferred head shown in FIG. 1 is capable of cutting, chipping and grinding through any impediment which may surround the old existing line 4, for example tree roots or concrete which encases the line 4. Additionally, the head can cut through a concrete manhole.

In the preferred system 10, a stabilizer 24 is attached to the drill string 14 ahead of head 12. Stabilizer 24 has fins 26 which have an outer diameter which is slightly less than the inner diameter of the line 4. The stabilizer 24 assists in maintaining the stability of the head 12 as it rotates and is pulled into engagement with the line 4. Behind the head 12 is a swivel 30. The purpose of the swivel 30 is to prevent rotation of the polyolefin pipe pulling attachment member 40. The details of the construction of pulling attachment 40 can be found in U.S. Ser. No. 08/327,556, entitled "Pulling Attachment for Plastic Pipe and Slip Lining Head", which is incorporated herein by reference. The pulling attachment 40 pulls into the hole created by the head 12 a polyolefin pipe 45, preferably polyethylene pipe.

Figure 3:
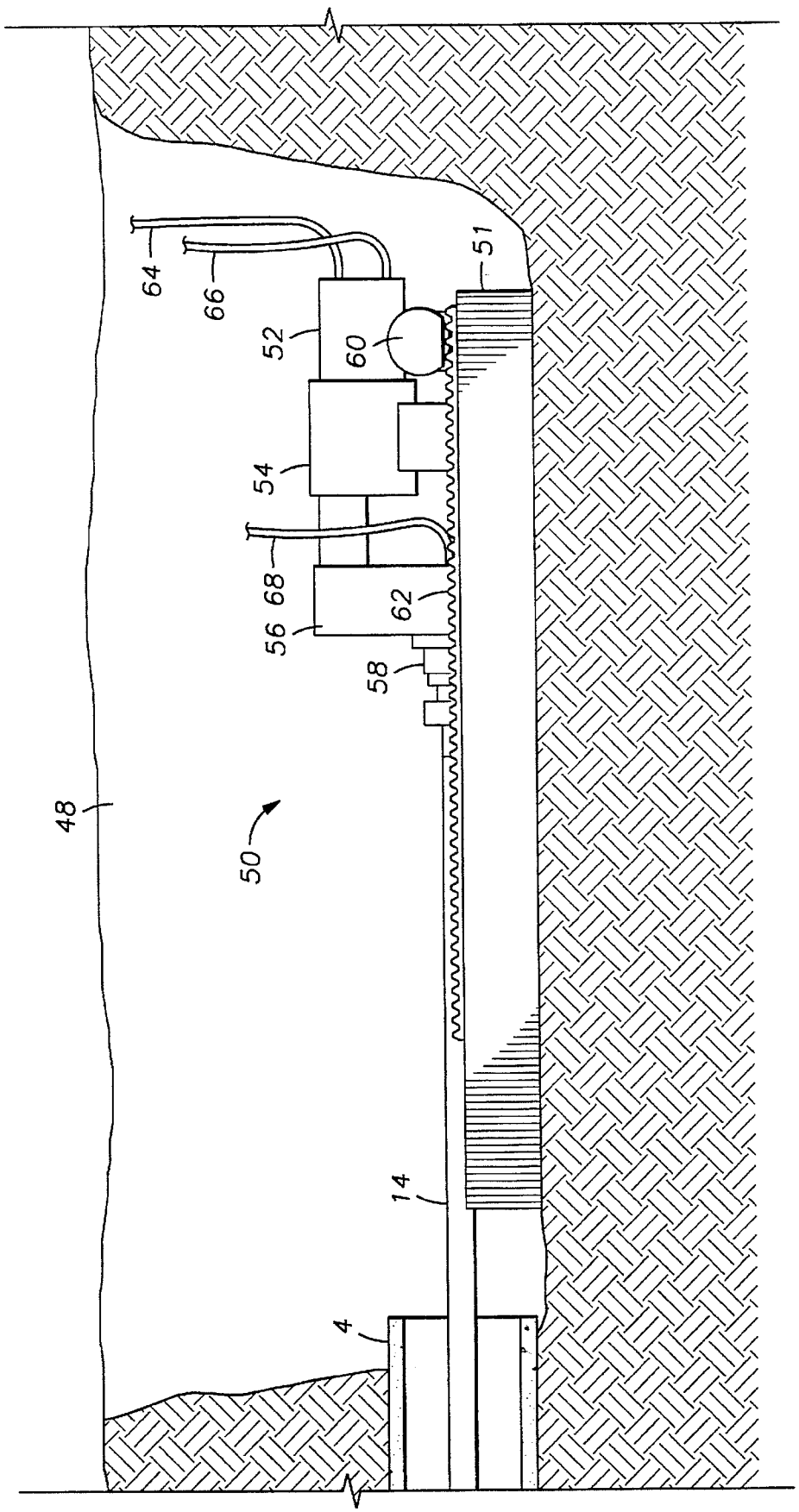
FIG. 3 is a schematic view of the drilling unit which operates the system of the present invention.

Referring now to FIG. 3, a pit 48 has a drilling unit 50 shown aligned with the existing line 4. The drilling unit 50 includes a centrifugal motor 52 and transmission 54. A gear box 56 which converts the power generated into rotation of a chuck 58. The chuck 58 is connected to a joint of drill pipe 14 to rotate the entire string 14. As joints of drill pipe are inserted into the existing line 4, a new joint is added to the string in the position shown in FIG. 3. The chuck 58 and string 14 is moved to the left by a pinion 60 mounted on a rack 62. When the chuck 58 is near the left end or front of the base 51, the joint attached to the chuck 58 is disassembled and the carriage carrying the chuck 58 and motor 52 is moved back to the position shown. Another joint of drilling pipe is added and the operation repeated. The removal of the utility line 4 involves the reverse operation. In the position shown, rotation of the chuck 58 and the drilling string 14 is stopped and a joint of pipe removed and taken to the surface. The carriage is then moved to the left end of the base 51 and attached to the next joint of drilling pipe 14. Thereafter, the carriage is moved to the right while rotating the chuck 58 and drilling pipe 14, which in turn rotates the head 12. The rotation and axial movement causes the head 12 to cut, chip and grind away a further length of the existing line 4. Hydraulic lines 64 and 66 are attached to the motor 52 to power both the rotation and the axial movement of the drilling pipe 14. As shown, the carriage is mounted on a rack and pinion construction; however, a set of pistons or a screw may be used to move the chuck 58 axially.

Figure 4:
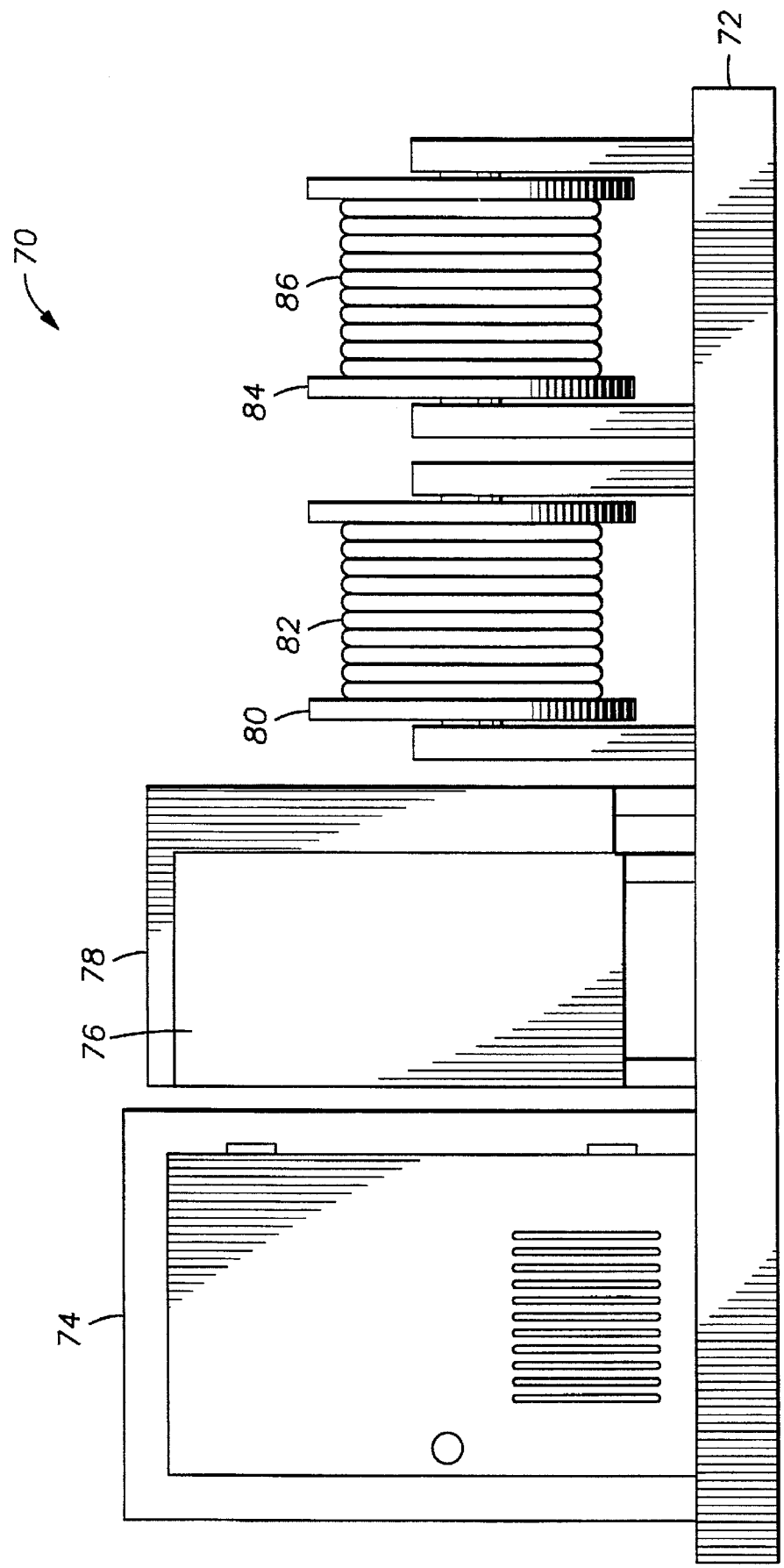
FIG. 4 is a schematic view of the power unit which operates the system of the present invention.

The power unit 70 for the system 10 of the present invention is shown schematically in FIG. 4. A power supply 74, such as a diesel motor and centrifugal pumps, provide the hydraulic fluid from tank 76. A spool 80 carries the hydraulic lines 82 necessary to connect to the lines 64 and 66 of motor 52 of the drilling unit 50. The drilling unit 50 requires 4,000 ft# torque and 20,000# pullback@maximum 150 rpm. Road boring units have been built which provide the required power for system 10 of the present invention.

In the preferred embodiment, fluid is used in the operation. Water is the preferred fluid; however, a biodegradable polymer or drilling fluids may be used. Fluid from tank 78 is provided to the chuck by line 68 filling the drilling pipe 14 during the pulling of the head 12 through the existing line 4. The fluid exits through openings 90 in the shaft or joint 14 of head 12. The fluid reduces heat build up surrounding the roller bits 16 and 20. Further, the fluid reduces friction and aids in the compaction of the pieces of line 4 to improve the hole stability to the pulling of the polyolefin pipe 45 through the hole formed by head 12.

As pointed out herein above, the system of the present invention removes an existing utility main. Systems of the prior art such as those using impact to fracture the main or a mandrel to fracture the main fail to remove the invert or bottom of the old existing main. Thus, any new pipe is placed on top of the invert. In contrast, the present invention cuts, chips and grinds away the lower portion of the old existing pipe as well as the sides and top which may already be broken. In a system of the prior art which uses the existing old line as a guide, the prior art system may tend to rise toward the surface when there is no integrity of the top of the old existing line and when integrity is restored not be able to reenter the existing line or if surrounding the existing line, may tend to dig deeper and then when integrity is restored not be able to again surround the existing line. In contrast, the head of the system of the present invention uses one set of roller bits to rotate on whatever surface of the existing line is present and a stabilizer sitting on the invert to assist the second set of roller bits to cut, chip and grind away the remaining portion of the existing line.

We claim:

1. A method for removing an existing utility main and replacing said main with a polyolefin pipe which comprises:

exposing two ends of a section of said main;

attaching to a drilling unit a drill string of pipe joints:

extending said drill string inside said main, from one exposed end of the section of the main to the other exposed end of the section of the main;

imparting linear pulling motion and rotation from said drilling unit to said drill string;

rotating inside said main a plurality of roller bits supported by a head attached to said drill string, said roller bits engaging, scoring, cutting, and chipping said main into pieces, said pieces then passing through said head, leaving an empty hole;

packing said pieces into said hole.

2. A method according to claim 1 which further includes:

digging an entrance pit and an exit pit, one of each said pits disposed at an end of said section of said main;

placing said drilling unit in said entrance pit and aligning said drilling unit with said main's center.

3. A method according to claim 1 which further includes:

maintaining said head's stability as it rotates.

4. A method according to claim 1 which further includes:

providing fluid to said roller bits.

5. A method according to claim 1 which further includes:

utilizing a non-rotating pipe-pulling member to pull said polyolefin pipe into said hole.

6. A system for entering and removing an existing utility main and replacing said main with a polyolefin pipe comprising:

a drill string of pipe joints:

a head connected to said drill string;

a plurality of roller bits mounted on said head;

a swivel; attached to said head a pipe-pulling attachment member attached to said swivel;

a polyolefin pipe attached to said pipe-pulling attachment member: and means to rotate said drill string and head and to provide linear pulling movement to the drill string, the head, the swivel, the pipe-pulling attachment member, and the polyolefin pipe.

7. A system according to claim 6 which further comprises:

a stabilizer attached to said drill string, said stabilizer having an outer diameter slightly smaller than the inside diameter of said main and disposed to enter said main anterior to said head.

8. A system according to claim 7 wherein said roller bits comprise two sets of roller bits, each set rotating on a different plane.

9. A system according to claim 7 which further includes:

means to provide fluid through said drill string to said head.

* * * * *